United States Patent [19]

Mahabadi et al.

[11] Patent Number: 5,395,723
[45] Date of Patent: Mar. 7, 1995

[54] LOW GLOSS, LOW MELT CROSS-LINKED TONER RESINS

[75] Inventors: Hadi K. Mahabadi, Etobicoke; Enno E. Agur, Toronto, both of Canada; Edul N. Dalal, Webster, N.Y.

[73] Assignee: Xerox Corporation, Stamford, Conn.

[21] Appl. No.: 953,617

[22] Filed: Sep. 30, 1992

[51] Int. Cl.⁶ .................................. G03G 9/00
[52] U.S. Cl. .................................. 430/109; 430/137; 430/904; 528/272
[58] Field of Search .................. 430/109, 137, 904; 528/272

[56] References Cited

U.S. PATENT DOCUMENTS

| | | | |
|---|---|---|---|
| Re. 31,072 | 11/1982 | Jadwin et al. | 430/99 |
| 3,590,000 | 6/1971 | Palermiti et al. | 252/62.1 |
| 3,681,106 | 8/1972 | Burns et al. | 117/17.5 |
| 3,876,736 | 4/1975 | Takiura | 264/40 |
| 3,941,898 | 3/1976 | Sadamatsu et al. | 427/18 |
| 4,089,917 | 5/1978 | Takiura et al. | 264/40.3 |
| 4,298,672 | 11/1981 | Lu | 430/108 |
| 4,338,390 | 7/1982 | Lu | 430/106 |
| 4,513,074 | 4/1985 | Nash et al. | 430/106.6 |
| 4,533,614 | 8/1985 | Fukumoto et al. | 430/99 |
| 4,556,624 | 12/1985 | Gruber et al. | 430/110 |
| 4,565,763 | 1/1986 | Uchiyama et al. | 430/109 |
| 4,604,338 | 8/1986 | Gruber et al. | 430/106 |
| 4,797,339 | 1/1989 | Maruyama et al. | 430/109 |
| 4,824,750 | 4/1989 | Mahalek et al. | 430/99 |
| 4,894,308 | 1/1990 | Mahabadi et al. | 430/137 |
| 4,935,326 | 6/1990 | Creatura et al. | 430/108 |
| 4,937,166 | 6/1990 | Creatura et al. | 430/108 |
| 4,939,060 | 7/1990 | Tomiyama et al. | 430/106.6 |
| 4,973,439 | 11/1990 | Chang et al. | 264/101 |
| 4,990,293 | 2/1991 | Macosko et al. | 264/40.1 |
| 5,057,392 | 10/1991 | McCabe et al. | 430/109 |
| 5,135,833 | 8/1992 | Matsunaga et al. | 430/110 |
| 5,147,747 | 9/1992 | Wilson et al. | 430/109 |
| 5,156,937 | 10/1992 | Alexandrovich et al. | 430/110 |
| 5,227,460 | 7/1993 | Mahabadi et al. | 430/137 |

FOREIGN PATENT DOCUMENTS

| | | |
|---|---|---|
| 0261585 | 3/1988 | European Pat. Off. . |
| 0550989 | 7/1993 | European Pat. Off. . |
| 0553559 | 8/1993 | European Pat. Off. . |
| 55-166651 | 12/1980 | Japan . |
| 56-94362 | 7/1981 | Japan . |
| 56-116041 | 9/1981 | Japan . |
| 63-309967 | 12/1988 | Japan . |

OTHER PUBLICATIONS

English-Language Translation of Japanese Patent Document No. 57-81272 Aug. 1982.
English-Language Translation of Japanese Patent Document No. 58-158651 Dec. 1983.
English-Language Translation of Japanese Patent Document No. 60-104956 Oct. 1985.

Primary Examiner—Steve Rosasco
Attorney, Agent, or Firm—Oliff & Berridge

[57] ABSTRACT

A low melt, low gloss toner resin with low minimum fix temperature and wide fusing latitude contains a linear portion and 20–45% by weight of a cross-linked portion containing high density, cross-linked microgel particles, but substantially free of low density, cross-linked polymer. The resin is particularly suitable for low gloss applications such as black only and highlighting and for high speed fusing, shows excellent offset resistance and wide fusing latitude and superior vinyl offset properties. The resin may be formed by reactive melt mixing.

33 Claims, 3 Drawing Sheets

LOW GLOSS, LOW MELT CROSS-LINKED TONER RESINS

The present invention is generally directed to toner resins and toners and to processes for preparing them. More specifically, the present invention relates to partially cross-linked resins that can be selected for the preparation of low gloss or matte finish heat fixable toners with, for example, excellent low temperature fixing characteristics and superior offset properties in a hot roll fixing system, and with excellent vinyl offset properties.

BACKGROUND

A need exists for toners which melt at lower temperatures than a number of toners now commercially used with certain copying and printing machines. Temperatures of approximately 160°–200° C. are often selected to fix toner to a support medium such as a sheet of paper or transparency to create a developed image. Such high temperatures may reduce or minimize the life of certain fuser rolls such as those made of silicone rubbers or fluoroelastomers (e.g., Viton®), may limit fixing speeds, may necessitate larger amounts of power to be consumed during operation of a copier or printer such as a xerographic copier which employs a method of fixing such as, for example, hot roll fixing.

Toner utilized in development in the electrographic process is generally prepared by mixing and dispersing a colorant and a charge enhancing additive into a thermoplastic binder resin, followed by micropulverization. As the thermoplastic binder resin, several polymers are known including polystyrenes, styrene-acrylic resins, styrene-methacrylic resins, polyesters, epoxy resins, acrylics, urethanes and copolymers thereof. As the colorant, carbon black is utilized often, and as the charge enhancing additive, alkyl pyridinium halides, distearyl dimethyl ammonium methyl sulfate, and the like are known.

To fix the toner to a support medium, such as a sheet of paper or transparency, hot roll fixing is commonly used. In this method, the support medium carrying a toner image is transported between a heated fuser roll and a pressure roll, with the image face contacting the fuser roll. Upon contact with the heated fuser roll, the toner melts and adheres to the support medium, forming a fixed image. Such a fixing system is very advantageous in heat transfer efficiency and is especially suited for high speed electrophotographic processes.

Fixing performance of the toner can be characterized as a function of temperature. The lowest temperature at which the toner adheres to the support medium is called the Cold Offset Temperature (COT), and the maximum temperature at which the toner does not adhere to the fuser roll is called the Hot Offset Temperature (HOT). When the fuser temperature exceeds HOT, some of the molten toner adheres to the fuser roll during fixing and is transferred to subsequent substrates containing developed images, resulting for example in blurred images. This undesirable phenomenon is called offsetting. Between the COT and HOT of the toner is the Minimum Fix Temperature (MFT) which is the minimum temperature at which acceptable adhesion of the toner to the support medium occurs, as determined by, for example, a creasing test. The difference between MFT and HOT is called the Fusing Latitude.

The hot roll fixing system and a number of toners used therein, however, exhibit several problems. First, the binder resins in the toners can require a relatively high temperature in order to be affixed to the support medium. This may result in high power consumption, low fixing speeds, and reduced life of the fuser roll and fuser roll bearings. Second, offsetting can be a problem. Third, toners containing vinyl type binder resins such as styrene-acrylic resins may have an additional problem which is known as vinyl offset. Vinyl offset occurs when a sheet of paper or transparency with a fixed toner image comes in contact for a period of time with a polyvinyl chloride (PVC) surface containing a plasticizer used in making the vinyl material flexible such as, for example, in vinyl binder covers, and the fixed image adheres to the PVC surface.

Many toner resins developed to date with wide fusing latitude have the required melt viscosity to produce images with low gloss on plain paper, for example from about 1 to about 15 gloss units (hereinafter called low gloss or matte toner resin; also hereinafter all gloss units refer to TAPPI T480 75° specular gloss). Although these properties are desired, the fixing or fusing temperature of toners made from these resins are high and usually more than 160° C. Furthermore, toner containing these vinyl-type resins show poor vinyl offset properties. On the other hand, many toner resins having lower melt temperatures show a sharp drop in their melt viscosity as temperature increases. As a result, images produced from toners based on these resins have a high gloss, for example, more than 40 gloss units. Although low melt/high gloss toners are desired in some applications, this is not the case for other applications, for example those used for highlight color and black only. Toners imparting highlight color are often used to supplement black images. Such toners preferably produce a low gloss (matte) finish.

There is a need for a low gloss toner resin which has a fix temperature below 200° C., preferably below 160° C. (hereinafter called low fix temperature toner resin or low melt toner resin), good offset performance, and superior vinyl offset property, and processes for the preparation of such a resin. Toners which operate at lower temperatures would reduce the power needed for operation and increase the life of the fuser roll and the high temperature fuser roll bearings. Additionally, such low melt toner resins would reduce the volatilization of release oil such as silicon oil which may occur during high temperature operation and which can cause problems when the volatilized oil condenses in other areas of the machine. In particular, low gloss toners with a wide fusing latitude and with good toner particle elasticity are needed. Such toners with wide fusing latitude can provide flexibility in the amount of oil needed as release agent and can minimize copy quality deterioration related to the toner offsetting to the fuser roll.

In order to lower the minimum fix temperature of the binder resin, in some instances the molecular weight of the resin may be lowered. Low molecular weight and amorphous polyester resins and epoxy resins have been used for low temperature fixing toners. For example, attempts to use polyester resins as a binder for toner are disclosed in U.S. Pat. No. 3,590,000 to Palermiti et al. and U.S. Pat. No. 3,681,106 to Burns et al. The minimum fixing temperature of polyester binder resins can be lower than that of other materials, such as styrene-acrylic and styrene-methacrylic resins. However, this may lead to a lowering of the hot offset temperature, and as a result, decreased offset resistance. In addition, the glass transition temperature of the resin may be decreased, which may cause the undesirable phenomenon of blocking of the toner during storage. Furthermore, toner prepared from such a resin will produce glossy images (gloss->40 gloss units) with undesirable crease performance.

U.S. Pat. No. 5,057,392 to McCabe et al., discloses a low fusing temperature toner powder which employs a polyblend of a crystalline polyester and an amorphous polyester that has been cross-linked with an epoxy novolac resin in the presence of a cross-linking catalyst. The disclosed polyblend contains a mechanical mixture of the crystalline and amorphous polyester melt blended together. The crystalline polyester is required to maintain a desired low melt temperature and the amorphous polyester is required to maintain a desired high offset temperature. In the polyblend, the amorphous polyester is partially cross-linked with the epoxy novolac resin. The disclosed toner powder cannot be achieved in the absence of crystalline and amorphous polyesters, and upon completion of cross-linking, the crystalline polyester recrystallizes as dispersed small particles within a matrix phase of the cross-linked amorphous polyester and epoxy resin. In a disclosed process for preparing the toner particles, the crystalline polyester, amorphous polyester resin, epoxy novolac resin, cross-linking catalyst, colorant, crystallization promoter and optional charge control agent are melt blended, preferably by an extrusion process. During melt blending, the amorphous polyester is cross-linked with the epoxy novolac resin. After melt blending the mixture is annealed to recrystallize the crystalline polyester. The disclosed melt blended mixture is not useful as a toner particle for use in toners requiring a low melt temperature until it is annealed. In addition, the image prepared on low gloss paper with toner prepared from such a mixture is very glossy.

To prevent fuser roll offsetting and to increase fuser latitude of toners, various modifications have been made in toner composition. For example waxes, such as low molecular weight polyethylene, polypropylene, etc., have been added to toners to increase the release properties, as disclosed in U.S. Pat. No. 4,513,074 to Nash et al., the entire disclosure of which is hereby totally incorporated by reference herein. However, to prevent offset sufficiently, considerable amounts of such materials may be required in some instances, resulting in detrimental effects such as the tendency to toner agglomeration, worsening of free flow properties and destabilization of charging properties.

Modification of binder resin structure, for example by branching, cross-linking, etc., when using conventional polymerization reactions may also improve offset resistance. In U.S. Pat. No. 3,681,106 to Burns et al., for example, a polyester resin was improved with respect to offset resistance by nonlinearly modifying the polymer backbone by mixing a trivalent or more polyol or polyacid with the monomer to generate branching during polycondensation. However, an increase in degree of branching may result in an elevation of the minimum fix temperature. Thus, any initial advantage of low temperature fix may be diminished.

U.S. Pat. No. 4,797,339 to Maruyama et al. discloses a modified toner resin containing a particle-to-particle ionically cross-linked resin complex. The disclosed cross-linked resin complex is obtained by reacting a cationic resin emulsion and an anionic resin emulsion. The resulting resin ion complex has a glass transition temperature of −90° to 100° C. and a degree of gellation of from 0.5 to 50% by weight, preferably 10 to 30% by weight. It is stated that if the degree of gellation is too high beyond 50% by weight, the fixability of the toner at low temperatures tends to be reduced undesirably. If it is too low below 0.5% by weight, scattering of the toner tends to increase undesirably. The emulsion polymerization process disclosed results in production of a sol component in the polymer (i.e., cross-linked portions which are not densely cross-linked).

A method of improving offset resistance of low gloss resin is to utilize cross-linked resin in the binder resin. For example, U.S. Pat. No. 3,941,898 to Sadamatsu et al. discloses a toner in which a cross-linked vinyl type polymer, prepared using conventional cross-linking methods, is used as the binder resin. Similar disclosures for vinyl type resins are made in U.S. Pat. Nos. Re. 31,072 (a reissue of 3,938,992) to Jadwin et al., 4,556,624 to Gruber et al., 4,604,338 to Gruber et al. and 4,824,750 to Mahalek et al.

While significant improvements can be obtained in offset resistance and entanglement resistance, a major drawback may ensue in that with cross-linked resins prepared by conventional polymerization (that is, cross-linking during polymerization using monomer and a cross-linking agent), there exist three types of polymer configurations: a linear and soluble portion called the linear portion, a portion comprising highly cross-linked gel particles which is not soluble in substantially any solvent, e.g., tetrahydrofuran, toluene and the like, and is called gel, and a cross-linked portion which is low in cross-linking density and therefore is soluble in some solvents, e.g., tetrahydrofuran, toluene and the like, and is called sol. Also, there are monomeric units between the cross-linked polymer chains. The presence of highly cross-linked gel in the binder resin reduces the gloss properties of resin and increases the hot offset temperature, but at the same time the low cross-link density portion or sol increases the minimum fix temperature. An increase in the amount of cross-linking in these types of resins results in an increase not only of the gel content, but also of the amount of sol or soluble cross-linked polymer with low degree of cross-linking in the mixture. This results in an elevation of the minimum fix temperature, and as a consequence, in a reduction or reduced increase of the fusing latitude. In addition, a drawback of embodiments of cross-linked polymers prepared by conventional polymerization is that as the degree of cross-linking increases, the gel particles or very highly cross-linked insoluble polymer with high molecular weight grow larger. The large gel particles can be more difficult to disperse pigment in, causing the formation of unpigmented toner particles during pulverization, and toner developability may thus be hindered. Also, compatibility with other binder resins may be relatively poor and toners containing vinyl polymers often show vinyl offset.

Cross-linked polyester binder resins prepared by conventional polycondensation reactions have been made for improving offset resistance, and reducing image gloss, such as, for example, in U.S. Pat. No. 3,681,106 to Burns et al. As with cross-linked vinyl resins, increased cross-linking as obtained in such conventional polycondensation reactions may cause the minimum fix temperature to increase. When cross-linking is carried out during polycondensation using tri- or polyfunctional monomers as cross-linking agents with the polycondensation monomers, the net effect is that apart from making highly cross-linked high molecular weight gel particles which are not soluble in substantially any solvent, the molecular weight distribution of the soluble part widens due to the formation of sol or cross-linked polymer with a very low degree of cross-linking, which is soluble in some solvents. These intermediate high molecular weight species may result in an increase in the melt viscosity of the resin at low and high temperature, which can cause the minimum fix temperature to increase. Furthermore, gel particles formed in the polycondensation reaction which is carried out using conventional polycondensation in a reactor with low shear mixing (i.e., less than 0.1KW-hr/kg) can grow rapidly with increase in degree of cross-linking. As in the case of cross-linked vinyl polymers using conventional polymerization reactions, these large gel particles may be more difficult to disperse pigment in, resulting in unpigmented toner particles after pulverization, and thus hindering developability.

U.S. Pat. No. 4,533,614 to Fukumoto et al. discloses a loosened cross-linked polyester binder resin which shows low temperature fix and good offset resistance. Metal compounds were used as cross-linking agents. Similar disclosures are presented in U.S. Pat. No. 3,681,106 and Japanese Laid-Open Patent Applications Nos. 94362/1981, 116041/1981 and 166651/1980. As discussed in the '614 patent, incorporation of metal complexes, however, can influence unfavorably the charging properties of the toner. Also, in the case of color toners other than black (e.g., cyan), metal complexes can adversely affect the color of pigments. It is also known that metal containing toner can have disposal problems in some geographical areas, such as for example in the State of California, U.S.A. Metal complexes are often also expensive materials.

Many processes are known for effecting polymerization reactions, including reactive extrusion processes, for both initial polymerization reactions employing monomers or prepolymers, and for polymer modification reactions, such as graft, coupling, cross-linking and degradation reactions.

U.S. Pat. No. 4,894,308 to Mahabadi et al. and U.S. Pat. No. 4,973,439 to Chang et al., for example, disclose extrusion processes for preparing electrophotographic toner compositions in which pigment and charge control additive were dispersed into the binder resin in the extruder. However, in each of these patents, there is no suggestion of a chemical reaction occurring during extrusion.

An injection molding process for producing cross-linked synthetic resin molded articles is disclosed in U.S. Pat. No. 3,876,736 to Takiura in which polyolefin or polyvinyl chloride resin and cross-linking agent were mixed in an extruder, and then introduced into an externally heated reaction chamber outside the extruder wherein the cross-linking reaction occurred at increased temperature and pressure, and at low or zero shear.

In U.S. Pat. No. 4,089,917 to Takiura et al., an injection molding and cross-linking process is disclosed in which polyethylene resin and cross-linking agent were mixed in an extruder and reacted in reaction chambers at elevated temperature and pressure. Heating of the resin mixture occurred partially by high shear in inlet flow orifices. However, the cross-linking reaction in this process still took place in the reaction chambers at low or zero shear, and the final product is a thermoset molded part, and thus is not useful for toner resins.

A process for dispensing premixed reactive precursor polymer mixtures through a die for the purposes of reaction injection molding or coating is described in U.S. Pat. No. 4,990,293 to Macosko et al. in which polyurethane precursor systems were cross-linked in the die and not in the extruder. The dimensions of the die channel were determined such that the value of the wall shear stress was greater than a critical value in order to prevent gel buildup and consequent plugging of the die. The final product is a thermoset molded part, and thus is not useful for toner resins.

It should be noted that the processes disclosed in U.S. Pat. Nos. 3,876,736, 4,089,917 and 4,990,293 are not reactive extrusion processes, because the cross-linking in each case occurs in a die or a mold, and not in an extruder, and the cross-linking takes place at low or zero shear. These processes are for producing engineering plastics such as thermoset materials which cannot be remelted once molded, and thus are not useful in toner applications.

Toners which melt at low temperatures and have low gloss finishes, require resins which melt at low temperatures and impart low gloss characteristics to toners made therefrom.

SUMMARY OF THE INVENTION

Research conducted in connection with the present invention has demonstrated that reactive polymers, such as for example, unsaturated polyester resins, can be modified by partial cross-linking by reactive extrusion to obtain a wide range of unique properties required for low melt temperature, low gloss toner applications.

Embodiments of the present invention overcome the above-discussed problems in the prior art. The present invention provides a thermoplastic resin for toner which can be sufficiently fixed at low temperatures (e.g., below 200° C., preferably below 160° C.) by hot roll fixing which produces images with a low gloss or matte finish. Resins according to the present invention can have fusing latitudes of more than about 20° C. Thus, less heat or other source of energy is needed for fixing than for higher fix temperature toner resins while enabling images with very low gloss or matte finish. Hence, less power is consumed during operation of a copier or printer. The undesirable paper curl phenomenon may also be reduced, or higher speed of copying and printing may be enabled. Also, toner prepared from the resin of the invention has excellent offset resistance, wide fusing latitude and good rheological properties required for low melt and low gloss application, is inexpensive, safe and economical, shows minimized or substantially no vinyl offset and produces images with a low gloss or matte finish.

The toner resin of the invention comprises cross-linked portions and linear portions. The cross-linked portions comprise very high molecular weight densely cross-linked gel particles having an average diameter less than about 0.1 micron. The cross-linking length between two cross-linked molecules is very short; preferably the cross-linking lengths do not exceed one to two atoms. The cross-linked portions are insoluble in substantially any solvent, including tetrahydrofuran, toluene and the like. The cross-linked portions comprise about 20% to about 45% percent by weight of the toner resin. The linear portion comprises low molecular weight resin soluble in various solvents such as for example tetrahydrofuran, toluene and the like. The high molecular weight highly cross-linked gel particles are substantially uniformly distributed in the linear portions. Substantially no portion of the resin comprises sol or low density cross-linked polymer, such as that which would be obtained in conventional cross-linking processes such as polycondensation, bulk, solution, suspension, emulsion and dispersion polymerization processes.

The toner resin of the invention may be fabricated by a reactive melt mixing process to produce low cost and safe cross-linked thermoplastic binder resins for toners which have low fix temperature and high offset temperature, and which show minimized or substantially no vinyl offset and are suitable for toner applications requiring low gloss or matte finishes. In this process, polymers are cross-linked in the molten state under high temperature and high shear conditions, preferably using chemical initiators as cross-linking agents without utilizing monomer for cross-linking. Minimized or no residual materials are left in the resin after cross-linking.

In a process of the invention, a reactive resin (hereinafter called base resin) such as, for example, unsaturated linear polyester resin, is cross-linked in the molten state under high temperature and high shear conditions, preferably using a chemical initiator such as, for example, organic peroxide, as a cross-linking agent, in a batch or continuous melt mixing device, without forming any significant amounts of residual materials. Thus, the removal of byproducts or residual unreacted materials is not needed with embodiments of a process of the invention. In preferred embodiments of this process, the base resin and initiator are preblended and fed upstream to a melt mixing device such as an extruder at an upstream location, or the base resin and initiator are fed separately to the melt mixing device at either upstream or downstream locations. An extruder screw configuration, length and temperature may be used which enable the initiator to be well dispersed in the polymer melt before the onset of cross-linking, and further, which provide a sufficient, but short, residence time for the cross-linking reaction to be carried out. Adequate temperature control enables the cross-linking reaction to be carried out in a controlled and reproducible fashion. Gel content of the resin according to the present invention may be controlled by controlling melt temperature and/or amount of chemical initiator. For example, a temperature sufficiently high to achieve cross-linking is maintained in the presence of a chemical initiator. Once the desired amount of cross-linking is obtained, the melt temperature is reduced to terminate the cross-linking reaction. The gel content may also be controlled by the amount of chemical initiator used. Furthermore, the choice of extruder screw configuration and length can also enhance the high shear conditions to distribute microgels formed during the cross-linking reaction throughout the polymer melt, and to keep the microgels from inordinately increasing in size with increasing degree of cross-linking. An optional devolatilization zone may be used to remove any volatiles, if needed. The polymer melt may then be pumped through a die to a pelletizer.

The above process can be ,utilized to produce a low cost, safe cross-linked toner resin with substantially no unreacted or residual byproducts of cross-linking, which can be sufficiently fixed at low temperature by hot roll fixing to afford energy saving, is particularly suitable for high speed fixing, shows excellent offset resistance and wide fusing latitude (e.g., low fix temperature and high offset temperature), shows minimized or no vinyl offset and is useful in toners which produce a low gloss or matte finish.

DETAILED DESCRIPTION OF PREFERRED EMBODIMENTS

There is a need for a low gloss cross-linked resin which contains 20–45% by weight of a highly cross-linked portion in the form of microgels distributed throughout the linear portion, in the substantial absence of sol, in which the polymer is densely cross-linked without monomeric units between the cross-linked chains and the size of the gel particles does not grow with increasing degree of cross-linking, and which is useful in preparing low gloss toner resins. Furthermore, there is a need for an effective process for producing such a resin. The present invention provides such a resin which can be prepared by a reactive melt mixing process.

For applications such as black only and highlight color, toner resin should produce images having low gloss or matte finishes with a gloss ranging from about 1 to about 15 gloss units.

The present invention provides a low fix temperature, low gloss toner resin, and specifically a low fix temperature low gloss toner resin based on cross-linked resin comprised of cross-linked and linear portions, the cross-linked portion consisting essentially of microgel particles substantially uniformly distributed throughout the linear portion. In this resin the cross-linked portion consists essentially of microgel particles, preferably up to about 0.1 micron, more preferably about 0.005 to about 0.1 micron, in average volume particle diameter as determined by scanning electron microscopy and transmission electron microscopy as well as by light scattering. When produced by a reactive melt mixing process wherein the cross-linking occurs at high temperature and under high shear, the size of the microgel particles does not continue to grow with increasing degree of cross-linking. Also, the microgel particles are distributed substantially uniformly throughout the linear portion.

The cross-linked portions or microgel particles are prepared in such a way that there is substantially no distance between the polymer chains. Thus the cross-linking is not accomplished via monomer or polymer bridges. The polymer chains are directly connected, for example at unsaturation sites or other reactive sites, or in some cases by a single intervening atom such as, for example, oxygen. Therefore, the cross-linked portions are very dense and do not swell as much as gel produced by conventional cross-linking methods. This cross-link structure is different from conventional cross-linking in which the cross-link distance between chains is quite large with several monomer units, and where the gels swell very well in a solvent such as tetrahydrofuran or toluene. These highly cross-linked dense microgel particles distributed throughout the linear portion impart elasticity to the resin which improves the resin offset properties, while not substantially affecting the resin minimum fix temperature.

Cross-linked toner resins having above described features are disclosed in detail in copending U.S. patent application Ser. No. 07/814,792 filed Dec. 30, 1991, the entire disclosure of which is hereby incorporated by reference.

The present invention provides a new type of toner resin having a low melt temperature and low gloss or matte finish which is preferably a partially cross-linked unsaturated resin such as unsaturated polyester prepared by cross-linking a linear unsaturated resin (hereinafter called base resin) such as linear unsaturated polyester resin preferably with a chemical initiator in a melt mixing device such as, for example, an extruder at high temperature (e.g., above the melting temperature of the resin and preferably up to about 150° C. above that melting temperature) and under high shear (e.g., specific shear energy input of 0.1 to 0.5 kW-hr/kg). In preferred embodiments, the base resin has a degree of unsaturation of about 0.1 to about 30 mole percent, preferably about 5 to about 25 mole percent. The shear levels should be sufficient to inhibit microgel growth above about 0.1 micron average particle diameter, preferably from about 0.005 to about 0.1 microns, and to ensure substantially uniform distribution of the microgel particles. Such shear levels are readily available in melt mixing devices such as extruders.

The toner resin of this invention has a weight fraction of the microgel (gel content) in the resin mixture in the range typically from about 20 to about 45 weight percent, preferably about 30 to about 40 weight percent. The rheology of the resulting resin is unique and specific for low gloss/low melt applications and is characterized by a sharp drop in viscosity at low temperature followed by a leveling off of the viscosity at higher temperatures as depicted by curve B in FIG. 1. The uncross-linked base resin, preferably unsaturated polyester, is present in the range of from about 55 to about 80 percent by weight of said toner resin, and preferably in the range from about 70 to 80 percent by weight of said toner resin. The uncross-linked resin preferably consists essentially of low molecular weight reactive base resin which does not cross-link during the cross-linking reaction, preferably unsaturated polyester resin.

According to embodiments of the invention, the number-average molecular weight ($M_n$) of the linear portion, as measured by gel permeation chromatography (GPC), is in the range typically from about 1,000 to about 20,000, and preferably from about 2,000 to about 5,000. The weight-average molecular weight ($M_w$) of the linear portion is in the range typically from about 2,000 to about 40,000, and preferably from about 4,000 to about 15,000. The molecular weight distribution ($M_w/M_n$) of the linear portion is in the range typically from about 1.5 to about 6, and preferably from about 2 to about 4. The onset glass transition temperature ($T_g$) of the linear portion as measured by differential scanning calorimetry (DSC) for preferred embodiments is in the range typically from about 50° C. to about 70° C., and preferably from about 51° C. to about 65° C. Melt viscosity of the linear portion of preferred embodiments, as measured with a mechanical spectrometer at 10 radians per second, is from about 5,000 to about 200,000 poise, and preferably from about 20,000 to about 100,000 poise, at 100° C. and drops sharply with increasing temperature to from about 100 to about 5,000 poise, and preferably from about 400 to about 2,000 poise, as temperature rises from 100° C. to 130° C.

The low melt/low gloss toner resin contains a mixture of cross-linked resin microgel particles and a linear portion as illustrated herein. In embodiments of the toner resin of the invention, the onset $T_g$ is in the range typically from about 50° C, to about 70° C., and preferably from about 51° C. to about 65° C., and the melt viscosity, as measured with a mechanical spectrometer at 10 radians per second, is from about 5,000 to about 200,000 poise, and preferably from about 20,000 to about 100,000 poise, at 100° C. and from about 1000 to about 80,000 poise at 160° C.

The low fix temperature of the toner resin of this invention is a function of the molecular weight and molecular weight distribution of the linear portion, and is not affected by the amount of microgel particles or degree of cross-linking. This is portrayed by the proximity of the viscosity curves A and B of FIG. 1 at low temperature (such as, for example, at 100° C.) in which the melt viscosity is in the range from about 20,000 to about 100,000 poise as measured with a mechanical spectrometer at 10 radians per second. The hot offset temperature is increased with the presence of microgel particles which impart elasticity to the resin. High level of microgel content, for example from about 20 to about 45 weight percent, is required for low gloss or matte application.

The toner resin of the present invention can provide a low melt toner with a minimum fix temperature of from about 100° C. to about 200° C., preferably about 100° C. to about 160° C., more preferably about 110° C. to about 140° C., provide the low melt toner with a wide fusing latitude to minimize or prevent offset of the toner onto the fuser roll, maintain high toner pulverization efficiencies and provide toner with a low gloss finish. The low melt toner resin preferably has a fusing latitude greater than 10° C., preferably from about 10° C. to about 120° C., and more preferably more than about 20° C. and even more preferably more than about 30° C. The MFT of the toner is not believed to be sensitive to the cross-linking in the microgel particles of the toner resin. Toner resins and thus toners of the present invention show minimized or substantially no vinyl offset. The toner resin of the present invention can provide a low gloss or matte finish, for example, from about 1 to about 30 gloss units and more specifically, from about 1 to about 15 gloss units.

Figure 1:
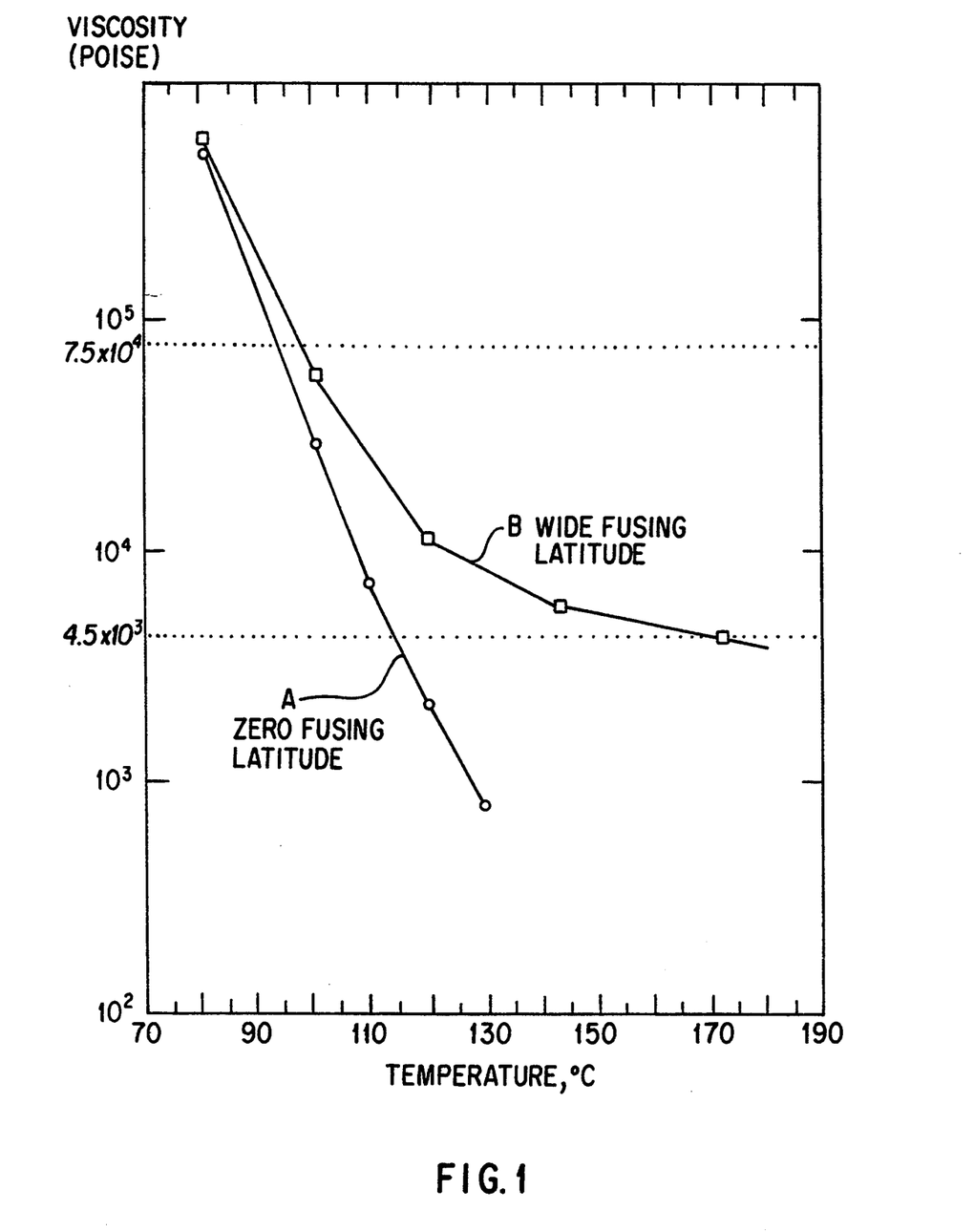
FIG. 1 depicts the effect of temperature on melt viscosity of various toner resins. Viscosity curve A is for a linear unsaturated polyester low fix temperature resin with very low fusing latitude (thus, it is not suitable for hot roll fusing) and suitable for producing high gloss images. Viscosity curve B is for cross-linked polyester, low fix temperature resins of the present invention with wide fusing latitude useful in making low gloss or matte images.

As the degree of cross-linking or microgel content increases, the low temperature melt viscosity does not change appreciably, while the high temperature melt viscosity goes up and image gloss decreases. In an exemplary embodiment, the hot offset temperature can increase approximately 70° C. This can be achieved by cross-linking in the melt state at high temperature and high shear such as, for example, by cross-linking an unsaturated polyester using a chemical initiator in an extruder resulting in the formation of microgel alone, distributed substantially uniformly throughout the linear portion, and substantially no intermediates or sol portions which are cross-linked polymers with low cross-linking density. FIG. 1 represents the viscosity at different temperatures of a preferred embodiment with a high microgel content as compared with the viscosity at various temperatures of a base uncross-linked resin. FIG. 1 shows the leveling of the sharp decrease in viscosity as temperature increases for a resin according to the invention.

In a preferred embodiment, the cross-linked portion consists essentially of very high molecular weight microgel particles with high density cross-linking (measured by gel content) and which are not soluble in substantially any solvents such as, for example, tetrahydrofuran, toluene and the like. As discussed above, the microgel particles are highly cross-linked polymers with a very small cross-link distance; preferably the microgel particles are directly cross-linked. This type of cross-linked polymer may be formed by reacting chemical initiator with linear unsaturated polymer, and more preferably linear unsaturated polyester, at high temperature and under high shear. The initiator molecule breaks into radicals and reacts with one or more double bond or other reactive site within the polymer chain forming a polymer radical. This polymer radical reacts with other polymer chains or polymer radicals many times, forming a highly and directly cross-linked microgel. This renders the microgel very dense and results in the microgel not swelling well in solvent. The dense microgel also imparts elasticity to the resin, increases its hot offset temperature, and reduces the image gloss while not affecting its minimum fix temperature.

The weight fraction of the micro-gel (gel content) in the resin may be defined as follows:

$$\text{Gel Content} = \frac{\text{Total Sample Weight} - \text{Weight of Soluble Polymer}}{\text{Total Sample Weight}} \times 100\%$$

Figure 2A:
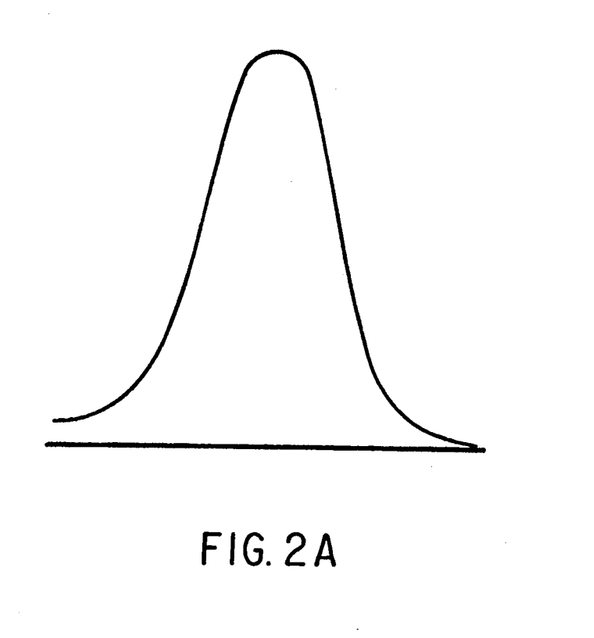
FIG. 2 depicts the molecular weight distribution of a partially cross-linked resin of the invention as compared with the molecular weight of a base resin before cross-linking.
Figure 2B:
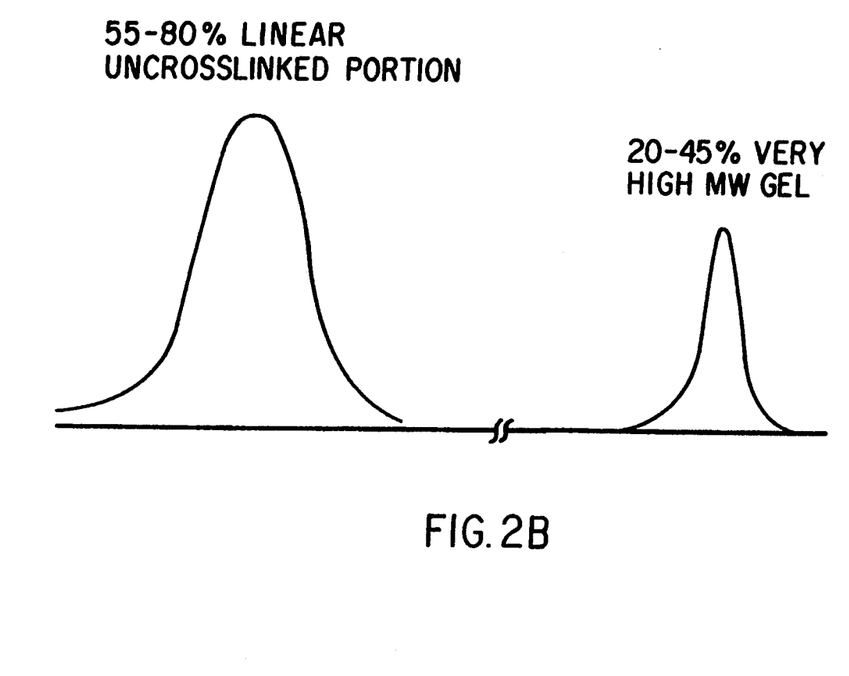

The gel content may be calculated by measuring the relative amounts of linear, soluble polymer and the nonlinear, cross-linked polymer utilizing the following procedure: (1) the sample of the cross-linked resin to be analyzed, in an amount between 145 and 235 mg, is weighed directly into a glass centrifuge tube; (2) 45 ml toluene is added and the sample is put on a shaker for at least 3 hours, preferably overnight; (3) the sample is then centrifuged at about 2500 rpm for 30 minutes and then a 5 ml aliquot is carefully removed and put into a preweighed aluminum dish; (4) the toluene is allowed to air evaporate for about 2 hours, and then the sample is further dried in a convection oven at 60° C. for about 6 hours or to constant weight; (5) the sample remaining, times nine, gives the amount of soluble polymer. Thus, utilizing this quantity in the above equation, the gel content can be easily calculated. FIG. 2 depicts the molecular weight distribution of a partially cross-linked resin according to the invention as compared with a base resin used in preparing the cross-linked resin. Specifically, FIG. 2 shows the percentage distribution of the higher molecular weight, densely cross-linked microgel component and the uncross-linked portion having a molecular weight similar to the base resin used.

Linear unsaturated polyesters which may preferably be used as the base resin are low molecular weight condensation polymers and which may be formed by step-wise reactions between both saturated and unsaturated diacids (or anhydrides) and dihydric alcohols (glycols or diols). The resulting linear unsaturated polyesters are reactive (e.g., cross-linkable) on two fronts: (i) unsaturation sites (double bonds) along the polyester chain, and (ii) functional groups such as carboxyl, hydroxy, etc. groups amenable to acid-base reactions. Typical unsaturated polyester base resins useful for this invention are prepared by melt polycondensation or other polymerization processes using diacids and/or anhydrides and diols. Suitable diacids and anhydrides include but are not limited to saturated diacids and/or anhydrides such as for example succinic acid, glutaric acid, adipic acid, pimelic acid, suberic acid, azelaic acid, sebacic acid, isophthalic acid, terephthalic acid, hexachloroendo methylene tetrahydrophthalic acid, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like and mixtures thereof; and unsaturated diacids and/or anhydrides such as for example maleic acid, fumaric acid, chloromaleic acid, methacrylic acid, acrylic acid, itaconic acid, citraconic acid, mesaconic acid, maleic anhydride, and the like and mixtures thereof. Suitable diols include but are not limited to for example propylene glycol, ethylene glycol, diethylene glycol, neopentyl glycol, dipropylene glycol, dibromoneopentyl glycol, propoxylated bisphenol A, 2,2,4-trimethylpentane-1,3-diol, tetrabromo bisphenol dipropoxy ether, 1,4-butanediol, and the like and mixtures thereof, soluble in good solvents such as, for example, tetrahydrofuran, toluene and the like.

Preferred unsaturated polyester base resins are prepared from diacids and/or anhydrides such as, for example, maleic anhydride, fumaric acid, and the like and mixtures thereof, and diols such as, for example, propoxylated bisphenol A, propylene glycol, and the like and mixtures thereof. A particularly preferred polyester is poly(propoxylated bisphenol A fumarate).

Substantially any suitable unsaturated polyester can be used to make the toner resins of the invention; including unsaturated polyesters known for use in toner resins and including unsaturated polyesters whose properties previously made them undesirable or unsuitable for use as toner resins (but which adverse properties are eliminated or reduced by preparing them in the partially cross-linked form of the present invention).

The cross-linking which occurs in the process of the invention is characterized by at least one reactive site (e.g., one unsaturation) within a polymer chain reacting substantially directly (e.g., with no intervening monomer(s)) with at least one reactive site within a second polymer chain, and by this reaction occurring repeatedly to form a series of cross-linked units. This polymer cross-linking reaction may occur by a number of mechanisms. Without intending to be bound by theory, it is believed that the cross-linking may occur through one or more of the following mechanisms:

For example, when an exemplary propoxylated bisphenol A fumarate unsaturated polymer undergoes a cross-linking reaction with a chemical cross-linking initiator, such as for example, benzoyl peroxide, free radicals produced by the chemical initiator may attack an unsaturation site on the polymer in the following manner:

-continued

This manner of cross-linking between chains will produce a large, high molecular weight molecule, ultimately forming a gel. (In preferred embodiments of this exemplary polyester, $m_1$ and $m_2$ are at least 1 and the sum of $m_1$ and $m_2$ is not greater than 3, or $m_1$ and $m_2$ are independently 1 to 3, and is approximately 8 to 11.)

By a second mechanism, cross-linking may occur between chains of the same exemplary molecule where the free radicals formed from a chemical cross-linking initiator such as benzoic acid attack the carbon of the propoxy group by hydrogen abstraction of a tertiary hydrogen of a benzoyloxy radical in the following manner:

Chemical initiators such as, for example, organic peroxides or azocompounds are preferred for making the cross-linked toner resins of the invention. Suitable organic peroxides include diacyl peroxides such as, for example, decanoyl peroxide, lauroyl peroxide and benzoyl peroxide, ketone peroxides such as, for example, cyclohexanone peroxide and methyl ethyl ketone, alkyl peroxyesters such as, for example, t-butyl peroxy neodecanoate, 2,5-dimethyl 2,5-di(2-ethyl hexanoyl peroxy) hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-tobutyl o-isopropyl mono peroxy carbonate, 2,5-dimethyl 2,5-di(benzoyl peroxy)hexane, oo-t-butyl o-(2-ethyl hexyl) mono peroxy carbonate, and oo-t-amyl o-(2-ethyl hexyl) mono peroxy carbonate, alkyl peroxides such as, for example, dicumyl peroxide, 2,5-dimethyl 2,5-di(t-butyl peroxy)hexane, t-butyl cumyl peroxide, α-α-bis(t-butyl peroxy)diisopropyl benzene, di-t-butyl peroxide and 2,5-dimethyl 2,5-di(t-butyl peroxy)hexyne-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di(t-butyl peroxy)valerate, 1,1-di(t-butyl peroxy) 3,3,5-trimethyl cyclohexane, 1,1-di(t-butyl peroxy)cyclohexane, 1,1-di(t-amyl peroxy)cyclohexane, 2,2-di(t-butyl peroxy)butane, ethyl 3,3-di(t-butyl peroxy)butyrate and ethyl 3,3-di(t-amyl peroxy)butyrate. Suitable azo-compounds include azobisisobutyronitrile, 2,2'-azobis(isobutyronitrile), 2,2'-azobis (2,4-dimethyl valeronitrile), 2,2'-azobis(methyl butyronitrile), 1,1'-azobis(cyano cyclohexane) and other similar known compounds.

By permitting use of low concentrations of chemical initiator and utilizing all of it in the cross-linking reaction, usually in the range from about 0.01 to about 10 weight percent, and preferably in the range from about 0.1 to about 4 weight percent, the residual contaminants produced in the cross-linking reaction in preferred embodiments can be minimal. Since the cross-linking can be carried out at high temperature, the reaction is very fast (e.g., less than 10 minutes, preferably about 2 seconds to about 5 minutes residence time) and thus little or no unreacted initiator remains in the product.

A reactive melt mixing process is a process wherein chemical reactions can be carried out on the polymer in the melt phase in a melt mixing device, such as an extruder. In preparing the toner resins of the invention, these reactions are used to modify the chemical structure and the molecular weight, and thus the melt rheology and fusing properties, of the polymer. Reactive melt mixing is particularly efficient for highly viscous materials, and is advantageous because it requires no solvents, and thus is easily environmentally controlled. It is also advantageous because it permits a high degree of initial mixing of resin and initiator to take place, and provides an environment wherein a controlled high temperature (adjustable along the length of the extruder) is available so that a very quick reaction can occur. It also enables a reaction to take place continuously, and thus the reaction is not limited by the disadvantages of a batch process, wherein the reaction must be repeatedly stopped so that the reaction products may be removed and the apparatus cleaned and prepared for another similar reaction. The specific gel content (i.e. amount of cross-linking) may be regulated by the length of time the extrusion mixture is maintained at elevated temperature. As soon as the desired amount of cross-linking is achieved, the reaction products can be quickly removed from the reaction chamber. The amount of initiator used may also control the amount of cross-linking. By providing a specific amount of initiator to effect a predetermined amount of cross-linking, the desired gel content (amount of cross-linking) is not exceeded.

The low melt toners and toner resins may be prepared by a reactive melt mixing process wherein reactive resins are partially cross-linked. For example, low melt toner resins and toners may be fabricated by a reactive melt mixing process comprising the steps of: (1) melting reactive base resin, thereby forming a polymer melt, in a melt mixing device; (2) initiating cross-linking of the polymer melt, preferably with a chemical cross-linking initiator and increased reaction temperature; (3) keeping the polymer melt in the melt mixing device for a sufficient residence time that partial cross-linking of the base resin may be achieved; (4) providing sufficiently high shear during the cross-linking reaction to keep the gel particles formed during cross-linking small in size and well distributed in the polymer melt; (5) optionally devolatilizing the polymer melt to remove any effluent volatiles. The high temperature reactive melt mixing process allows for very fast cross-linking which enables the production of substantially only microgel particles, and the high shear of the process prevents undue growth of the microgels and enables the microgel particles to be uniformly distributed in the resin.

In a preferred embodiment, the process comprises the steps of: (1) feeding base resin and initiator to an extruder; (2) melting the base resin, thereby forming a polymer melt; (3) mixing the molten base resin and initiator at low temperature to enable good dispersion of the initiator in the base resin before the onset of cross-linking; (4) initiating cross-linking of the base resin with the initiator by raising the melt temperature and controlling it along the extruder channel; (5) keeping the polymer melt in the extruder for a sufficient residence time at a given temperature such that the required amount of cross-linking is achieved; (6) providing sufficiently high shear during the cross-linking reaction thereby keeping the gel particles formed during cross-linking small in size and well distributed in the polymer melt; (7) optionally devolatilizing the melt to remove any effluent volatiles; and (8) pumping the cross-linked resin melt through a die to a pelletizer. The resin may be prepared by a reactive melt mixing process disclosed in detail in copending U.S. patent application Ser. No. 07/814,641, filed Dec. 30, 1991, the entire disclosure of which is hereby incorporated by reference.

In the process of the present invention, the fabrication of the cross-linked resin may be carried out in a melt mixing device such as an extruder described in U.S. Pat. No. 4,894,308 to Mahabadi et al., the disclosure of which is hereby totally incorporated herein by reference. Generally, any high shear, high temperature melt mixing device suitable for processing polymer melts may be employed, provided that the objectives of the present invention are achieved. Examples of continuous melt mixing devices include single screw extruders or twin screw extruders, continuous internal mixers, gear extruders, disc extruders and roll mill extruders. Examples of batch internal melt mixing devices include Banbury mixers, Brabender mixers and Haake mixers.

One suitable type of extruder is the fully intermeshing corotating twin screw extruder such as, for example, the ZSK-30 twin screw extruder, available from Werner & Pfleiderer Corporation, Ramsey, New Jersey, U.S.A., which has a screw diameter of 30,7 millimeters and a length-to-diameter (L/D) ratio of 37.2. The extruder can melt the base resin, mix the initiator into the base resin melt, provide high temperature and adequate residence time for the cross-linking reaction to be carried out, control the reaction temperature via appropriate temperature control along the extruder channel, optionally devolatilize the melt to remove any effluent volatiles if needed, and pump the cross-linked polymer melt through a die such as, for example, a strand die to a pelletizer. For chemical reactions in highly viscous materials, reactive extrusion is particularly efficient, and is advantageous because it requires no solvents, and thus is easily environmentally controlled. It is also advantageous because it permits a high degree of initial mixing of base resin and initiator to take place, and provides an environment wherein a controlled high temperature (adjustable along the length of the extruder) is available so that a very quick reaction can occur. It also enables a reaction to take place continuously, and thus the reaction is not limited by the disadvantages of a batch process, wherein the reaction must be repeatedly stopped so that the reaction products may be removed and the apparatus cleaned and prepared for another similar reaction. As soon as the desired amount of cross-linking is achieved, the reaction products can be immediately removed from the reaction chamber.

Figure 3:
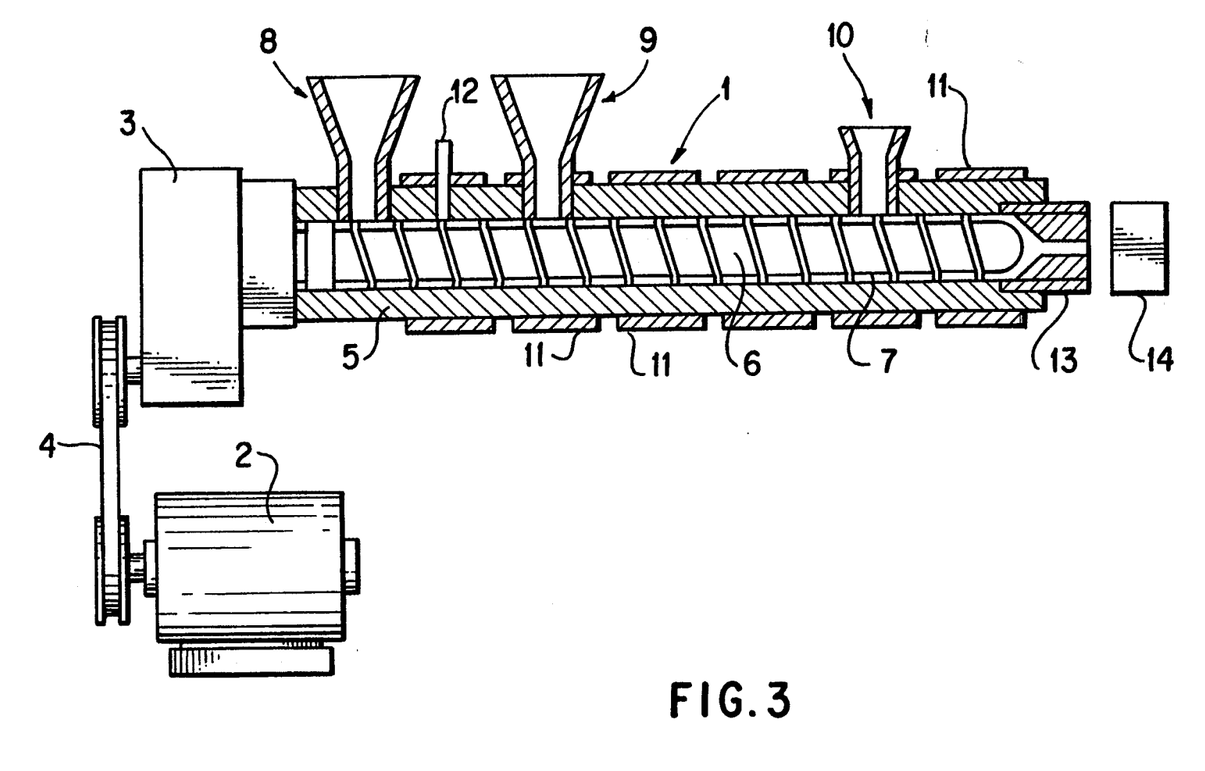
FIG. 3 is a partially schematic cross-sectional view of a reactive extrusion apparatus suitable for a process of the present invention.

For a better understanding of a process according to the present invention, a typical reactive extrusion apparatus suitable for the process of the present invention is illustrated in FIG. 3. FIG. 3 shows a twin screw extrusion device 1 containing a drive motor 2, a gear reducer 3, a drive belt 4, an extruder barrel 5, a screw 6, a screw channel 7, an upstream supply port or hopper 8, a downstream supply port 9, a downstream devolatilizer 10, a heater 11, a thermocouple 12, a die or head pressure generator 13, and a pelletizer 14. The barrel 5 consists of modular barrel sections, each separately heated with heater 11 and temperature controlled by thermocouple 12. With modular barrel sections, it is possible to locate feed ports and devolatilizing ports at required locations, and to provide segregated temperature control along the screw channel 7. The screw 6 is also modular, enabling the screw to be configured with modular screw elements and kneading elements having the appropriate lengths, pitch angles, etc. in such a way as to provide optimum conveying, mixing, reaction, devolatilizing and pumping conditions.

In operation, the components to be reacted and extruded, e.g., the base resin and chemical initiator, enter the extrusion apparatus from the first upstream supply port 8 and/or second downstream supply port 9. The base resin, usually in the form of solid pellets, chips, granules, or other forms can be fed to the first upstream supply port 8 and second downstream supply port 9 by starve feeding, gravity feeding, volumetric feeding, loss-in-weight feeding, or other known feeding methods. Feeding of the chemical initiator to the extruder depends in part on the nature of the initiator. In one embodiment of the invention, especially if the initiator is a solid, the base resin and initiator are preblended prior to being added to the extruder, and the preblend, the base resin and/or additional initiator may be added through either upstream supply port 8, downstream supply port 9, or both. In another embodiment, especially if the initiator is a liquid, the base resin and initiator can preferably be added to the separately through upstream supply port 8, downstream supply port 9, or both. This does not preclude other methods of adding the base resin and initiator to the extruder. After the base resin and initiator have been fed into screw channel 7, the resin is melted and the initiator is dispersed into the molten resin as it is heated, but preferably still at a lower temperature than is needed for cross-linking. Heating takes place from two sources: (1) external barrel heating from heaters 11, and (2) internal heating from viscous dissipation within the polymer melt itself. When the temperature of the molten resin and initiator reach a critical point, onset of the cross-linking reaction takes place. It is preferable, although not absolutely necessary, that the time required for completion of the cross-linking reaction not exceed the residence time in the screw channel 7. The rotational speed of the extruder screw preferably ranges from about 50 to about 500 revolutions per minute. If needed, volatiles may be removed through downstream devolatilizer 10 by applying a vacuum. At the end of screw channel 7, the cross-linked resin is pumped in molten form through die 13, such as for example a strand die, to pelletizer 14 such as, for example, a water bath pelletizer, underwater granulator, etc.

With further reference to FIG. 3, the rotational speed of the screw 6 can be of any suitable value provided that the objectives of the present invention are achieved. Generally, the rotational speed of screw 6 is from about 50 revolutions per minute to about 500 revolutions per minute. The barrel temperature, which is controlled by thermocouples 12 and generated in part by heaters 11, is from about 40° C. to about 250° C. The temperature range for mixing the base resin and initiator in the upstream barrel zones is from about the melting temperature of the base resin to below the cross-linking onset temperature, and preferably within about 40° C. of the melting temperature of the base resin. For example, for an unsaturated polyester base resin the temperature is preferably about 90° C. to about 130° C. The temperature range for the cross-linking reaction in the downstream barrel zones is above the cross-linking onset temperature and the base resin melting temperature, preferably within about 150° C. of the base resin melting temperature. For example, for an unsaturated polyester base resin, the temperature is preferably about 90° C. to about 250° C. The die or head pressure generator 13 generates pressure from about 50 pounds per square inch to about 500 pounds per square inch. In one embodiment, the screw is allowed to rotate at about 100 revolutions per minute, the temperature along barrel 5 is maintained at about 70° C. in the first barrel section and 160° C. further downstream, and the die pressure is about 50 pounds per square inch.

When cross-linking in a batch internal melt mixing device, the residence time is preferably in the range of about 10 seconds to about 5 minutes. The rotational speed of a rotor in the device is preferably about 10 to about 500 revolutions per minute.

The resins are generally present in the toner of the invention in an amount of from about 40 to about 98 percent by weight, and more preferably from about 70 to about 98 percent by weight, although they may be present in greater or lesser amounts, provided that the objectives of the invention are achieved. For example, toner resins of the invention can be subsequently melt blended or otherwise mixed with a colorant, charge carrier additives, surfactants, emulsifiers, pigment dispersants, flow additives, and the like. The resultant product can then be pulverized by known methods such as milling to form toner particles. The toner particles preferably have an average volume particle diameter of about 5 to about 25, more preferably about 5 to about 15, microns.

Various suitable colorants can be employed in toners of the invention, including suitable colored pigments, dyes, and mixtures thereof including Carbon Black, such as Regal 330®carbon black (Cabot), Acetylene Black, Lamp Black, Aniline Black, Chrome Yellow, Zinc Yellow, Sicofast Yellow, Luna Yellow, Novaperm Yellow, Chrome Orange, Bayplast Orange, Cadmium Red, Lithol Scarlet, Hostaperm Red, Fanal Pink, Hostaperm Pink, Lithol Red, Rhodamine Lake B, Brilliant Carmine, Heliogen Blue, Hostaperm Blue, Neopan Blue, PV Fast Blue, Cinquassi Green, Hostaperm Green, titanium dioxide, cobalt, nickel, iron powder, Sicopur 4068 FF, and iron oxides such as Mapico Black (Columbia), NP608 and NP604 (Northern Pigment), Bayferrox 8610 (Bayer), MO8699 (Mobay), TMB-100 (Magnox), mixtures thereof and the like.

The colorant, preferably carbon black, cyan, magenta and/or yellow colorant, is incorporated in an amount sufficient to impart the desired color to the toner. In general, pigment or dye is employed in an amount ranging from about 2 to about 60 percent by weight, and preferably from about 2 to about 7 percent by weight for color toner and about 5 to about 60 percent by weight for black toner.

Various known suitable effective positive or negative charge enhancing additives can be selected for incorporation into the toner compositions of the present invention, preferably in an amount of about 0.1 to about 10, more preferably about 1 to about 3, percent by weight. Examples include quaternary ammonium compounds inclusive of alkyl pyridinium halides; alkyl pyridinium compounds, reference U.S. Pat. No. 4,298,672, the disclosure of which is totally incorporated hereby by reference; organic sulfate and sulfonate compositions, U.S. Pat. No. 4,338,390, the disclosure of which is totally incorporated hereby by reference; cetyl pyridinium tetrafluoroborates; distearyl dimethyl ammonium methyl sulfate; aluminum salts such as Bontron E84 TM or E88 TM (Hodogaya Chemical); and the like.

Additionally, other internal and/or external additives may be added in known amounts for their known functions.

Any appropriate initiation technique for cross-linking can be used in a process according to the invention. Exemplary chemical initiators are listed above. A small concentration of initiator is adequate to carry out the cross-linking, usually in the range from about 0.01 to about 10 percent by weight of initiator in the base resin, and preferably in the range from about 0.1 to about 4 percent by weight of initiator in the base resin. These amounts of chemical initiator are preferred in obtaining the desired gel content according to the invention. By carrying out the cross-linking in the melt state at high temperature and high shear in a melt mixing device such as an extruder, the gel particles formed during cross-linking are kept small (i.e. less than about 0.1 micron, and preferably about 0.005 to about 0.1 micron, in average volume particle diameter, as determined by scanning electron microscopy and transmission electron microscopy, as well as by light scattering) and their size does not grow with increasing degree of cross-linking. Also, the high shear enables the microgel particles to be substantially uniformly dispersed in the polymer melt.

An advantage of using a chemical initiator as the cross-linking agent is that by utilizing low concentrations of initiator (for example, less than 10 percent by weight and often less than 4 percent by weight) and carrying out the cross-linking at high temperature, little or no unreacted initiator remains in the product, and therefore, the residual contaminants produced in the cross-linking reaction are minimal.

The resulting toner particles optionally can be formulated into a developer composition by mixing with carrier particles. Illustrative examples of carrier particles that can be selected for mixing with the toner composition prepared in accordance with the present invention include those particles that are capable of triboelectrically obtaining a charge of opposite polarity to that of the toner particles. Accordingly, in one embodiment the carrier particles may be selected so as to be of a negative polarity in order that the toner particles which are positively charged will adhere to and surround the carrier particles. Illustrative examples of such carrier particles include granular zircon, granular silicon, glass, steel, nickel, iron ferrites, silicon dioxide, and the like. Additionally, there can be selected as carrier particles nickel berry carriers as disclosed in U.S. Pat. No. 3,847,604, the entire disclosure of which is hereby totally incorporated herein by reference, comprised of nodular carrier beads of nickel, characterized by surfaces of reoccurring recesses and protrusions thereby providing particles with a relatively large external area. Other carriers are disclosed in U.S. Pat. Nos. 4,937,166 and 4,935,326, the disclosures of which are hereby totally incorporated herein by reference.

The selected carrier particles can be used with or without a coating, the coating generally being comprised of fluoropolymers, such as polyvinylidene fluoride resins, terpolymers of styrene, methyl methacrylate, and a silane, such as triethoxy silane, tetrafluoroethylenes, other known coatings and the like.

The diameter of the carrier particles is generally from about 50 microns to about 1,000 microns, preferably from about 50 to about 200 microns, thus allowing these particles to possess sufficient density and inertia to avoid adherence to the electrostatic images during the development process. The carrier particles can be mixed with the toner particles in various suitable combinations. However, best results are obtained when about 1 part carrier to about 10 parts to about 200 parts by weight of toner are mixed.

Toners of the invention can be used in known electrostatographic imaging methods, although the fusing energy requirements of some of those methods can be reduced in view of the advantageous fusing properties of the toner of the invention as discussed herein. Thus for example, the toners or developers of the invention can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll at a temperature lower than 200° C., preferably lower than 160° C., and more preferably from about 100° C. to about 140° C.

The invention will further be illustrated in the following, nonlimiting examples, it being understood that these examples are intended to be illustrative only and that the invention is not intended to be limited to the materials, conditions, process parameters and the like recited herein. Parts and percentages are by weight unless otherwise indicated.

EXAMPLE I

A cross-linked unsaturated polyester resin is prepared by reacting 98.9 percent by weight of a linear bisphenol A fumarate polyester base resin having $M_n$ of about 4,600, $M_w$ of about 13,000, $M_w/M_n$ of about 2.83 as measured by GPC, onset $T_g$ of about 54° C. as measured by DSC, and melt viscosity of about 28,000 poise at 100° C. and about 700 poise at 130° C. (measured at 10 radians per second), and contains about 1,200 parts per million hydroquinone and 1.1 percent by weight benzoyl peroxide initiator as outlined in the following procedure.

The unsaturated polyester base resin and benzoyl peroxide initiator are blended in a rotary tumble blender for 30 minutes. The resulting dry mixture is then fed into a Werner & Pfleiderer ZSK-30 twin screw extruder, with a screw diameter of 30.7 mm and a length-to-diameter (L/D) ratio of 37.2, at 10 pounds per hour using a loss-in-weight feeder. The cross-linking is carried out in the extruder using the following process conditions: barrel temperature profile of 70/160/160/160/160/160/160° C., die head temperature of 160° C., screw rotational speed of 100 revolutions per minute and average residence time of about three minutes. The extrudate melt, upon exiting from the strand die, is cooled in a water bath and pelletized. The cross-linked polyester product has an onset $T_g$ of about 53° C. as measured by DSC, melt viscosity of about 63,000 poise at 100° C. and about 6,500 poise at 160° C. (measured at 10 radians per second), a gel content of about 30 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC, is found to have $M_n$ of about 4,500, $M_w$ of about 12,800, $M_w/M_n$ of about 2.84, and onset $T_g$ of about 54° C. which is substantially the same as the original non-cross-linked base resin, indicating it contains no sol.

Thereafter, a toner is formulated by melt mixing the above prepared cross-linked unsaturated polyester resin, 92 percent by weight, with 6 percent by weight carbon black and 2 percent by weight alkyl pyridinium halide charge enhancing additive in a Haake batch mixer. The toner is pulverized and classified to form a toner with an average particle diameter of about 10.2 microns and a geometric size distribution (GSD) of about 1.29. The toner is evaluated for fixing, gloss, blocking, and vinyl offset performance. The results in Table 1 show that the cold offset temperature is about 100° C., the minimum fix temperature is about 128° C., the hot offset temperature is about 165° C., the fusing latitude is about 37° C., and the gloss is less than about 5 gloss units. Also, the toner has excellent blocking performance (about 53° C. as measured by DSC) and shows no apparent vinyl offset.

EXAMPLE II

A cross-linked unsaturated polyester resin is prepared by reacting 98.8 percent by weight of a linear bisphenol A fumarate polyester base resin with properties described in Example I, and 1.2 percent by weight benzoyl peroxide initiator as outlined in the following procedure.

The unsaturated polyester base resin and benzoyl peroxide initiator are blended in a rotary tumble blender for 30 minutes. The resulting dry mixture is then fed into a Werner & Pfleiderer ZSK-30 twin screw extruder at 10 pounds per hour using a loss-in-weight feeder. The cross-linking is carried out in the extruder using the following process conditions: barrel temperature profile of 70/160/160/160/160/160/160° C., die head temperature of 160° C., screw rotational speed of 100 revolutions per minute and average residence time of about three minutes. The extrudate melt, upon exiting from the strand die, is cooled in a water bath and pelletized. The cross-linked polyester product has an onset $T_g$ of about 53° C. as measured by DSC, melt viscosity of about 70,000 poise at 100° C. and about 10,000 poise at 160° C. (measured at 10 radians per second), a gel content of about 35 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC, is found to have $M_n$ of about 4,500, $M_w$ of about 12,700, $M_w/M_n$ of about 2.82, and onset $T_g$ of about 54° C. which is substantially the same as the original non-cross-linked base resin, indicating it contains no sol.

Thereafter, a toner is prepared and evaluated according to the same procedure as in Example I except that the average particle diameter is about 10.7 microns and the GSD is about 1.31. The results in Table 1 show that the cold offset temperature about is 100° C., the minimum fix temperature is about 129° C., the hot offset temperature is about 175° C., the fusing latitude is about 46° C., and the gloss is less than about 5 gloss units. Also, the toner has excellent blocking performance (about 53° C. as measured by DSC) and shows no apparent vinyl offset.

EXAMPLE III

A cross-linked unsaturated polyester resin is prepared by reacting 98.7 percent by weight of a linear bisphenol A fumarate polyester base resin with properties described in Example I, and 1.3 percent by weight benzoyl peroxide initiator as outlined in the following procedure.

The unsaturated polyester base resin resin and benzoyl peroxide initiator are blended in a rotary tumble blender for 30 minutes. The resulting dry mixture is then fed into a Werner & Pfleiderer ZSK-30 twin screw extruder at 10 pounds per hour using a loss-in-weight feeder. The cross-linking is carried out in the extruder using the following process conditions: barrel temperature profile of 70/160/160/160/160/160/160° C., die head temperature of 160° C., screw rotational speed of 100 revolutions per minute and average residence time of about three minutes. The extrudate melt, upon exiting from the strand die, is cooled in a water bath and pelletized. The cross-linked polyester product has an onset $T_g$ of about 53° C. as measured by DSC, melt viscosity of about 78,000 poise at 100° C. and about 16,000 poise at 160° C. (measured at 10 radians per second), a gel content of about 39 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC, is found to have $M_n$ of about 4,500, $M_w$ of about 12,500, $M_w/M_n$ of about 2.78, and onset $T_g$ of about 54° C. which is substantially the same as the original non-cross-linked base resin, indicating it contains no sol.

Thereafter, a toner is prepared and evaluated according to the same procedure as in Example I except that the average particle diameter is about 9.8 microns and the GSD is about 1.32. The results in Table 1 show that the cold offset temperature is about 110° C., the minimum fix temperature is about 130° C., the hot offset temperature is about 190° C., the fusing latitude is about 60° C., and the gloss is less than about 5 gloss units. Also, the toner has excellent blocking performance (about 53° C. as measured by DSC) and shows no apparent vinyl offset.

EXAMPLE IV

A cross-linked unsaturated polyester resin is prepared by reacting 99.0 percent by weight of a linear bisphenol A fumarate polyester base resin with properties described in Example I, and 1.0 percent by weight benzoyl peroxide initiator as outlined in the following procedure.

The unsaturated polyester base resin and benzoyl peroxide initiator are blended in a rotary tumble blender for 30 minutes. The resulting dry mixture is then fed into a Werner & Pfleiderer ZSK-30 twin screw extruder at 10 pounds per hour using a loss-in-weight feeder. The cross-linking is carried out in the extruder using the following process conditions: barrel temperature profile of 70/180/180/180/180/180/180° C., die head temperature of 180° C., screw rotational speed of 100 revolutions per minute and average residence time of about three minutes. The extrudate melt, upon exiting from the strand die, is cooled in a water bath and pelletized. The cross-linked polyester product has an onset $T_g$ of about 53° C. as measured by DSC, melt viscosity of about 65,000 poise at 100° C. and about 7,200 poise at 160° C. (measured at 10 radians per second), a gel content of about 32 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC, is found to have $M_n$ of about 4,500, $M_w$ of about 12,700, $M_w/M_n$ of about 2.82, and onset $T_g$ of about 54° C. which is substantially the same as the original non-cross-linked base resin, indicating that it contains no sol.

Thereafter, a toner is prepared and evaluated according to the same procedure as in Example I except that the average particle diameter is about 9.5 microns and the GSD is about 1.30. The results in Table 1 show that the cold offset temperature is about 110° C., the minimum fix temperature is about 128° C., the hot offset temperature is about 165° C., the fusing latitude is about 37° C., and the gloss is less than about 5 gloss units. Also, the toner has excellent blocking performance (about 53° C. as measured by DSC) and shows no apparent vinyl offset.

EXAMPLE V

A cross-linked unsaturated polyester resin is prepared by reacting 99.4 percent by weight of a linear bisphenol A fumarate polyester base resin having $M_n$ of about 3,600, $M_w$ of about 9,300, $M_w/M_n$ of about 2.58 as measured by GPC, onset $T_g$ of about 54° C. as measured by DSC, and melt viscosity of about 20,000 poise at 100° C. and about 600 poise at 130° C. (measured at 10 radians per second) and contains about 400 parts per million hydroquinone, and 0.6 percent by weight benzoyl peroxide initiator as outlined in the following procedure.

The unsaturated polyester base resin and benzoyl peroxide initiator are blended in a rotary tumble blender for 30 minutes. The resulting dry mixture is then fed into a Werner & Pfleiderer ZSK-30 twin screw extruder at 10 pounds per hour using a loss-in-weight feeder. The cross-linking is carried out in the extruder using the following process conditions: barrel temperature profile of 70/160/160/160/160/160/160° C., die head temperature of 160° C., screw rotational speed of 100 revolutions per minute and average residence time of about three minutes. The extrudate melt, upon exiting from the strand die, is cooled in a water bath and pelletized. The product which is cross-linked polyester has an onset $T_g$ of about 53° C. as measured by DSC, melt viscosity of about 45,000 poise at 100 ° C. and about 5,600 poise at 160° C. (measured at 10 radians per second), a gel content of about 31 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC, is found to have $M_n$ of about 3,500, $M_w$ of about 9,000, $M_w/M_n$ of about 2.57, and onset $T_g$ of about 54° C. which is substantially the same as the original non-cross-linked base resin, indicating that it contains no sol.

Thereafter, a toner is prepared and evaluated according to the same procedure as in Example I except that the average particle diameter is about 10.1 microns and the GSD is about 1.33. The results in Table 1 show that the cold offset temperature is about 110° C., the minimum fix temperature is about 127° C., the hot offset temperature is about 165° C., the fusing latitude is about 38° C., and the gloss is less than about 5 gloss units. Also, the toner has excellent blocking performance (about 53° C. as measured by DSC) and shows no apparent vinyl offset.

TABLE 1

| | Summary of Examples I–V | | | | | | |
|---|---|---|---|---|---|---|---|
| Example | Sol, % | Gel, % | COT, °C. | MFT, °C. | HOT, °C. | FL, °C. | Gloss, gu |
| I | 0 | 30 | 110 | 128 | 165 | 37 | <5 |
| II | 0 | 35 | 110 | 129 | 175 | 46 | <5 |
| III | 0 | 39 | 110 | 130 | 190 | 60 | <5 |
| IV | 0 | 32 | 110 | 128 | 165 | 37 | <5 |

TABLE 1-continued

Summary of Examples I-V

| Example | Sol, % | Gel, % | COT, °C. | MFT, °C. | HOT, °C. | FL, °C. | Gloss, gu |
|---|---|---|---|---|---|---|---|
| V | 0 | 31 | 110 | 127 | 165 | 38 | <5 |

EXAMPLE VI

A cross-linked unsaturated polyester resin is prepared by reacting 98.65 percent by weight of a linear bisphenol A fumarate polyester base resin having $M_n$ of about 3,600, $M_w$ of about 11,000, $M_w/M_n$ of about 3.06 as measured by GPC, onset $T_g$ of about 55° C. as measured by DSC, and melt viscosity of about 30,600 poise at 100° C. and about 800 poise at 130° C. as measured at 10 radians per second and containing about 1100 parts per million hydroquinone, and 1.35 percent by weight t-amyl peroxy 2-ethyl hexanoate initiator as outlined in the following procedure.

49.325 grams unsaturated polyester base resin and 0.675 grams t-amyl peroxy 2-ethyl hexanoate initiator are separately charged into a Haake batch mixer, and the cross-linking is carried out in the mixer using the following process conditions: barrel temperature of 140° C., rotor speed of 100 revolutions per minute, and mixing time of 15 minutes. The resulting cross-linked polyester product has an onset $T_g$ of about about 54° C. as measured by DSC, melt viscosity of about 51,500 poise at 100° C. and about 3,400 poise at 160° C. (measured at 10 radians per second), a gel content of about 21 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC and DSC, is found to have $M_n$ of about 3,500, $M_w$ of about 10,700, $M_w/M_n$ of about 3.06, and onset $T_g$ of about 55° C. which is substantially the same as the original non-cross-linked base resin, indicating it contains substantially no sol.

Thereafter, a toner is formulated by melt mixing the above prepared cross-linked unsaturated polyester resin, 98 percent by weight, with 2 percent by weight PV Fast Blue pigment in a Haake batch mixer. The toner is pulverized and classified to form a toner with an average particle diameter of about 9.0 microns and the GSD is about 1.35. The toner is evaluated for fixing, gloss, blocking and vinyl offset performance. The results in Table 2 show that the cold offset temperature is about 110° C., the minimum fix temperature is about 127° C., the hot offset temperature is about 155° C., the fusing latitude is about 28° C., and the gloss is about 15 gloss units. Also, the toner has excellent blocking performance, about 53° C. (as measured by DSC), and shows no apparent vinyl offset.

EXAMPLE VII

A cross-linked unsaturated polyester resin is prepared by reacting 98.55 percent by weight of a linear bisphenol A fumarate polyester base resin with properties described in Example VI, and 1.45 percent by weight t-amyl peroxy 2-ethyl hexanoate initiator as outlined in the following procedure.

49.275 grams unsaturated polyester base resin and 0.725 grams t-amyl peroxy 2-ethyl hexanoate initiator are separately charged into a Haake batch mixer, and the cross-linking is carried out in the mixer using the following process conditions: barrel temperature of 140° C., rotor speed of 100 revolutions per minute, and mixing time of 15 minutes. The resulting cross-linked polyester product has an onset $T_g$ of about about 54° C. as measured by DSC, melt viscosity of about 60,300 poise at 100° C. and about 6,100 poise at 160° C. (measured at 10 radians per second), a gel content of about 29 weight percent and a mean microgel particle size of about 0.1 micron as determined by transmission electron microscopy.

The linear and cross-linked portions of the product are separated by dissolving the product in tetrahydrofuran and filtering off the microgel. The dissolved part is reclaimed by evaporating the tetrahydrofuran. This linear part of the resin, when characterized by GPC and DSC, is found to have $M_n$ of about 3,500, $M_w$ of about 10,500, $M_w/M_n$ of about 3.00, and onset $T_g$ of about 55° C. which is substantially the same as the original non-cross-linked base resin, indicating it contains substantially no sol.

Thereafter, a toner is prepared and evaluated according to the same procedure as in Example VI except that the average particle diameter is about 8.5 microns and the GSD is about 1.32. The results in Table 2 show that the cold offset temperature is about 110° C., the minimum fix temperature is about 129° C., the hot offset temperature is about 165° C., the fusing latitude is about 36° C., and the gloss is less than about 10 gloss units. Also, the toner has excellent blocking performance, about 53° C. (measured by DSC), and shows no apparent vinyl offset.

EXAMPLE VIII

A toner is formulated by melt mixing 98 percent by weight of the cross-linked unsaturated polyester resin described in Example I with 2 percent by weight PV Fast Blue pigment in a Haake batch mixer. The toner is pulverized and classified to form a toner with an average particle diameter of about 8.7 microns and the GSD is about 1.33. The toner is evaluated for fixing, gloss, blocking and vinyl offset performance. The results in Table 2 show that the cold offset temperature is about 110° C., the minimum fix temperature is about 127° C., the hot offset temperature is about 165° C., the fusing latitude is about 38° C., and the gloss is less than about 10 gloss units. Also, the toner has excellent blocking performance, about 53° C. (as measured by DSC), and shows no apparent vinyl offset.

TABLE 2

Summary of Examples VI-VIII

| Example | Sol, % | Gel, % | COT, °C. | MFT, °C. | HOT, °C. | FL, °C. | Gloss, gu |
|---|---|---|---|---|---|---|---|
| VI | 0 | 21 | 110 | 127 | 155 | 28 | 15 |
| VII | 0 | 29 | 110 | 129 | 165 | 36 | <10 |

TABLE 2-continued

Summary of Examples VI–VIII

| Example | Sol, % | Gel, % | COT, °C. | MFT, °C. | HOT, °C. | FL, °C. | Gloss, gu |
|---|---|---|---|---|---|---|---|
| VIII | 0 | 30 | 110 | 127 | 165 | 38 | <10 |

While the invention has been described with reference to particular preferred embodiments, the invention is not limited to the specific examples given and other embodiments and modifications can be made by those skilled in the art without departing from the spirit and scope of the invention.

What is claimed is:

1. A low melt, low gloss toner resin substantially free of sol comprising uncross-linked portions and cross-linked portions, said cross-linked portions consisting essentially of high density cross-linked microgel particles, wherein said microgel particles are present in an amount from about 20 to 45 percent by weight of said toner resin.

2. The toner resin of claim 1, wherein said microgel particles are about 0.005 to about 0.1 micron in average volume diameter and are substantially uniformly distributed in said resin.

3. The toner resin of claim 1, wherein said microgel particles have no more than a single bridging molecule between cross-linked chains.

4. The toner resin of claim 1, wherein said microgel particles are directly cross-linked.

5. The toner resin of claim 1, wherein said linear portions comprise linear unsaturated polyester resin.

6. The toner resin of claim 5, wherein said linear unsaturated polyester resin is poly(propoxylated bisphenol A fumarate).

7. The toner resin of claim 1, wherein said linear portions have a number-average molecular weight, $M_n$, as measured by gel permeation chromatography, in the range of from about 1000 to about 20,000; a weight-average molecular weight, $M_w$, in the range of from about 2000 to about 40,000; and a molecular weight distribution, $M_w/M_n$, in the range of from about 1.5 to about 6.

8. The toner resin of claim 1, wherein said linear portions have an onset glass transition temperature ($T_g$) as measured by differential scanning calorimetry in the range of from about 50° C. to about 70° C.

9. The toner resin of claim 1, wherein said linear portions have a melt viscosity as measured with a mechanical spectrometer at 10 radians per second, from about 5,000 to about 200,000 poise at 100 ° C., and said melt viscosity drops sharply with increasing temperature to from about 100 to about 5,000 poise as temperature rises from 100° C. to 130° C.

10. The toner resin of claim 1, wherein said resin has a minimum fix temperature below 160° C.

11. The toner resin of claim 1, wherein said resin has a fusing latitude of more than about 20° C.

12. The toner resin of claim 1, wherein said toner resin is prepared by a high temperature, high shear reactive melt mixing process.

13. The toner resin of claim 1, wherein toner prepared from this resin has a gloss from about 1 to about 30 gloss units.

14. A low fix temperature, low gloss toner substantially free of sol comprising colorant and toner resin, said toner resin consisting essentially of an uncross-linked phase and highly cross-linked microgel particles present in an amount from about 20 to about 45 percent by weight of said toner resin.

15. The toner of claim 14, wherein said toner resin comprises unsaturated polyester linear polymer.

16. The toner of claim 14, wherein said microgel particles have an average diameter of up to about 0.1 micron and are substantially uniformly dispersed in said uncross-linked phase.

17. The toner of claim 14, wherein said toner resin has an onset glass transition temperature of about 50° C. to about 70° C., and a melt viscosity, at 10 radians per second, from about 5,000 to about 200,000 poise at 100° C. and from about 1000 poise to about 80,000 poise at 160° C.

18. The toner of claim 14, wherein said toner has a minimum fix temperature below 160° C.

19. The toner of claim 14, wherein said toner has a fusing latitude of more than about 20° C.

20. The toner of claim 14, wherein said toner resin is prepared by a high shear, high temperature reactive melt mixing process.

21. The toner of claim 14, wherein said toner has a gloss of from about 1 to about 30 gloss units.

22. A reactive melt mixing process for preparing low fix temperature, low gloss toner resin substantially free of sol comprising linear and cross-linked portions, said cross-linked portions consisting essentially of high density, cross-linked microgel particles, comprising the steps of:

(a) melting a reactive base resin, thereby forming a polymer melt; and (b) cross-linking a portion of said polymer melt under high shear to form uniformly dispersed microgel particles in an amount of from about 20 to about 45 percent by weight of said toner resin.

23. The process of claim 22, wherein said process is a batch melt mixing process.

24. The process of claim 22, wherein a chemical initiator is used as a cross-linking agent.

25. The process of claim 24, wherein the weight fraction of said chemical initiator in said base resin is less than 10 weight percent.

26. The process of claim 22, further comprising the step of mixing said reactive base resin and a chemical initiator prior to forming said polymer melt.

27. The process of claim 26, further comprising the step of initiating cross-linking of said polymer melt with said chemical initiator by raising the temperature of said polymer melt above the onset of cross-linking temperature and controlling the temperature of said polymer melt during said cross-linking.

28. The process of claim 26, further comprising the step of initiating cross-linking of said polymer melt with said chemical initiator by raising the temperature of said polymer melt above the onset of cross-linking temperature and within 150° C. of the base resin melting temperature, and controlling the temperature of said polymer melt during said cross-linking.

29. The process of claim 22, further comprising the step of mixing a chemical initiator into said polymer melt at a temperature lower than the onset of cross-linking temperature, thereby producing good dispersion of the chemical initiator in said polymer melt prior to onset of cross-linking of said polymer melt.

30. The process of claim 22, comprising allowing said cross-linking reaction to be carried to completion.

31. The process of claim 22, wherein said reactive base resin is a linear unsaturated polyester resin.

32. The process of claim 31, wherein said linear unsaturated polyester resin is a poly(propoxylated bisphenol A fumarate).

33. The process of claim 22, wherein said melt mixing process is carried out in an extruder.

* * * * *